United States Patent [19]

Saiki

[11] Patent Number: 5,142,452
[45] Date of Patent: Aug. 25, 1992

[54] CHIP-TYPE SOLID ELECTROLYTIC CAPACITORS

[75] Inventor: Yoshihiko Saiki, Tokyo, Japan

[73] Assignee: NEC Corporation, Japan

[21] Appl. No.: 740,888

[22] Filed: Aug. 6, 1991

[30] Foreign Application Priority Data

Aug. 7, 1990 [JP] Japan .................................. 2-208507

[51] Int. Cl.$^5$ .......................... H01G 9/00; B01J 17/00
[52] U.S. Cl. ................................... 361/540; 29/25.03
[58] Field of Search ............... 29/25.03; 361/508, 509, 361/528, 529, 534–540

[56] References Cited

U.S. PATENT DOCUMENTS 4,064,611 12/1977 Sobozenski et al. ............... 29/25.03
5,036,434 7/1991 Kobayashi ........................... 361/540

FOREIGN PATENT DOCUMENTS 61-31609 7/1986 Japan .

*Primary Examiner*—Donald Griffin
*Attorney, Agent, or Firm*—Leydig, Voit & Mayer

[57] ABSTRACT

A chip-type solid electrolytic capacitor having an anode body (1) of valve-metal with an anode lead extending from one surface thereof and a dielectric layer (3) formed thereon, a cathode layer (5) formed on the electrolytic layer, an insulating layer (6) formed on the cathode layer so as to cover the one surface of the anode body, a plated layer (7a) formed on the insulating layer over the one surface, a solder layer (8a) formed on the plated layer, and an alloy layer (9) formed on an end portion of the anode lead, the alloy layer consisting of three metals of the anode lead, the plated layer, and the solder layer.

3 Claims, 2 Drawing Sheets

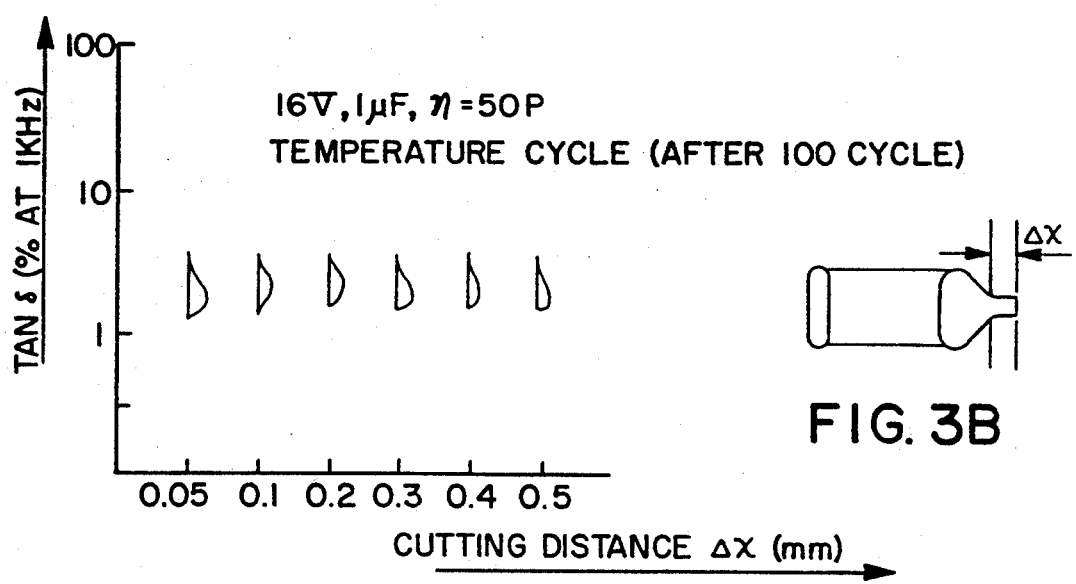
FIG. 3A
FIG. 3B
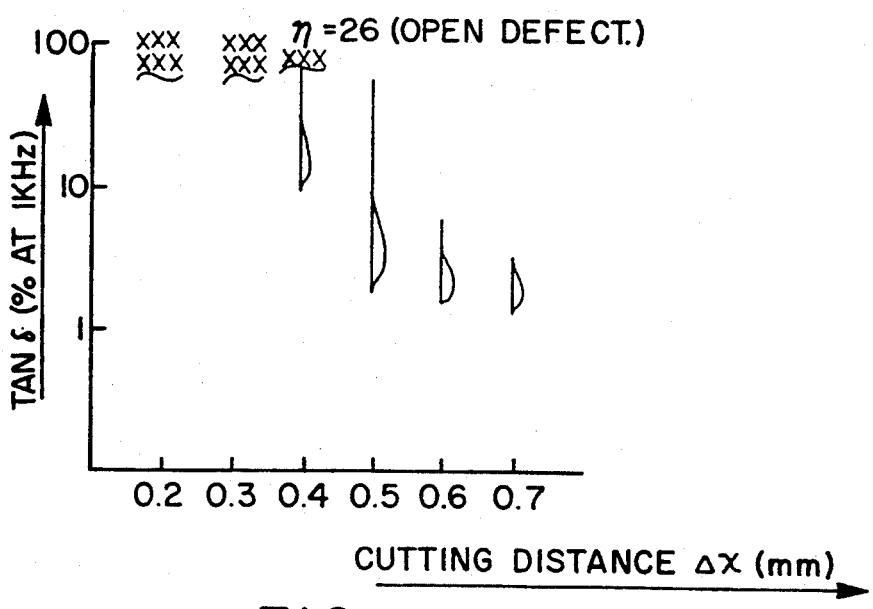
FIG. 4

CHIP-TYPE SOLID ELECTROLYTIC CAPACITORS

BACKGROUND OF THE INVENTION

1. Field of the Invention

This invention relates to a chip-type solid electrolytic capacitor, and more particularly to an electrode-structure having an improved connection reliability of an anode terminal.

2. Description of the Prior Art

To improve a volumetric efficiency of a conventional molded chip-type solid electrolytic capacitor, non-molded chip-type solid electrolytic capacitor is proposed in Japanese Published Patent No. Sho.61-31609 (1986), as shown in FIG. 1. A capacitor element 10 with an insulating resin 6 except for a bottom portion to expose a cathode layer. Each end surface of a capacitor element is coated with a conductor layer 14a and 14b as of silver paste, electroless plated layers 15a and 15b as of nickel, and solder layers 16a and 16b successively. An anode lead 2 is provided with a notch and finally folding the anode lead at the notch to cut it there.

However, because of the longer projection of the anode lead, a part-installing apparatus may cause accident such as snapping off by pawls of the apparatus during setting the capacitor to the printed wiring board or the like. This is for the reason that in the method making the notch by a cutting blade, the thinning of the cutting blade is limited to well keep the mechanical strength of the cutting blade and therefore it is impossible to cut thinner than this thickness. Another reason is that it is needed to take enough long cutting size to prevent the conductive layer on the anode lead from peeling from it due to the mechanical stress while cutting.

It has further disadvantage that because of the bonding through the intervention of the Van der Waals force between the anode lead and the electroless plated layer, the bonding strength becomes decreased due to mechanical and thermal stresses during part-installing process, and the tangent of the dielectric loss (referred to as tan δ hereinafter) becomes increased.

For the purpose of improving this, for example, a method is proposed for enhancing the adhesive strength which comprises making a partial surface of the anode lead rough by the sand blast technique or the like, and then forming an electroless plating layer, as disclosed in the above Japanese Patent. This however presents problems not only of complicating process but also which may cause damage of the conversion coating and increase in leakage current by impingement while blasting.

SUMMARY OF THE INVENTION

An object of the present invention is to provide a chip-type solid electrolytic capacitor not only with an anode terminal having an improved connection reliability but also with an anode lead shorter-cut and an anode terminal surface flattened, thus permitting minimizing part-installing troubles.

The chip-type solid electrolytic capacitor according to the present invention, an anode lead is cut shortly by using a laser beam. The laser cut process is performed after forming a plated layer and a solder layer. When the anode lead is cut by the laser, the resultant anode lead cut-end portion contains an alloy layer consisting of the anode lead material, plated layer and solder layer, and thereby increasing a bonding strength between the anode lead and terminal layers.

BRIEF DESCRIPTION OF THE DRAWINGS

FIG. 3A shows the results of temperature cycling tests for characteristic—the dependence of tan δ on the cutting distance of the anode lead—of an embodiment of the present invention;

FIG. 3B is a schematic diagram for illustrating the cutting distance; and

FIG. 4 shows the results of temperature cycling tests for characteristic—the dependence of tan δ on the cutting distance of the anode lead—of one prior art chip-type solid electrolytic capacitor.

DESCRIPTION OF THE PREFERRED EMBODIMENT

Figure 2:
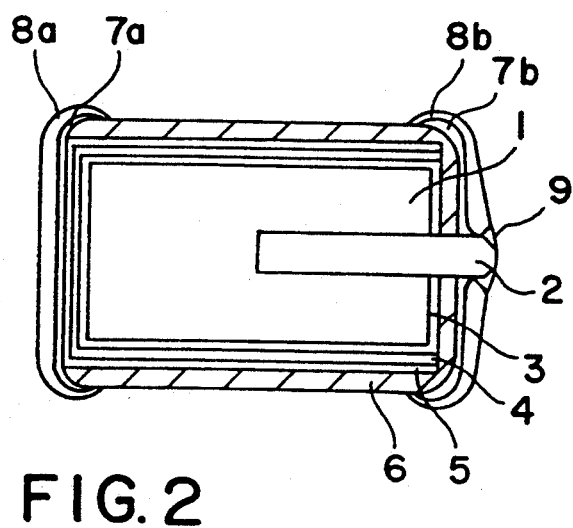
FIG. 2 is a longitudinal sectional view of a chip-type solid electrolytic capacitor of the present invention.

Referring to FIG. 2, an anode body 1 of sintered tantalum powder is provided with an anode lead 2 of tantalum projecting from the body through one end surface. (This end surface and the opposite end surface are referred to as anode and cathode terminal surfaces, respectively.) The anode body 1 has on the outer surfaces thereof covering layers: in sequence the innermost oxide film 3, a manganese dioxide layer 4 and a cathode metal-layer 5 consisting of a graphite layer and nickel plate layer.

Further an insulating resin layer 6 overlies on all the outer surfaces of the anode body except the cathode terminal surface. There is provided on this opened cathode terminal surface a cathode terminal made by forming, after depositing a metallic catalyst powder, a nickel plate layer 7a followed by a solder layer 8a. On the other hand there is provided an anode terminal made by forming, after depositing an organic compound of a metal catalyst, a nickel plate layer, followed by solder layer 8b on the partial outer surfaces of the insulating resin layer 6 corresponding to the anode terminal surface and its surroundings and on the anode lead 2. According to the present invention, the anode lead 2 is cut by using a laser beam to cause an alloy layer 9 at a cut-end portion. The alloy layer 9 consists of tantalum, nickel and solder and has a great bonding strength at the cut-end portion.

The process of manufacturing the chip-type tantalum solid electrolytic capacitor of the above-stated construction will be described in detail hereinafter:

Tantalum powder is subjected to pressure forming and sintered in vacuo at a high temperature to obtain an anode body 1 with an anode lead 2 of tantalum projecting therefrom. The anode body 1 is anodized in an aqueous solution of phosphoric acid by applying an anodizing voltage of 100 volts to form a tantalum oxide film layer 3 over the whole outer surface thereof. Subsequently deposition of manganese nitrate by dipping into a solution of the compound, followed by pyrolytic decomposition into a manganese dioxide layer 4 in a 250°–300° C. atmosphere. This dipping and pyrolytic decomposition are repeated a plurality of times to obtain a uniform manganese dioxide layer.

The resultant anode body 1 with the outermost layer of manganese dioxide is dipped in a graphite suspension in which graphite powder is suspended in an aqueous solution of a water-soluble high molecular substance, and then dried in a 150° to 200° C. atmosphere to form a graphite layer. Subsequently palladium powder serving as a catalytic metal for plating is deposited onto this graphite layer, and then electroless plating is performed by using a plating solution such as a nickel plating solution containing a dimethylaminoboran as a reducing agent at 65° C. for 40 minutes to form a nickel plate layer of about 4 to 5 μm thick. Thus a cathode layer 5 of metal consisting of the graphite and plate layers is formed.

In the following step, in the state where the opposite-surface to the anode lead is masked, powdery epoxy resin is electrostatically applied to the outer surfaces of the unit and then temporarily hardened in a 100° to 200° C. atmosphere for about 30 secs. After removing the masking, the unit is reheated at a 100° to 200° C. atmosphere for 30 to 60 minutes until it has been fully hardened. Thus an insulating layer 6 is formed.

As the next step a butyl acetate solution of an amine compound of palladium is applied onto the insulating resin layer 6 in the anode-terminal region including the anode terminal surface and its surroundings and onto the anode lead 2, and then subjected to pyrolytic decomposition at 200° C. for 30 minutes to deposit palladium powder of about 0.1 μm in particle diameter. Similarly palladium powder is deposited on the outer surface of the cathode terminal region including the cathode terminal surface and its surroundings corresponding to a partial surface of the insulating resin layer 6.

In the subsequent step of electroless plating, the unit is immersed in the above-mentioned electroless nickel plating solution including the anode lead 2 to form plated layers 7a and 7b with about 5 μm thickness. In this case no plated layer can be formed on the insulating resin layer 6 except the portions where palladium powder is deposited.

Besides the resultant unit is dipped in a flux, followed by an eutectic solder bath to form solder layers 8a and 8b with about 10 μm thickness on the plate layers 7a and 7b, respectively. Thus anode and cathode terminals are completed.

In the following step, the anode lead is cut by exposing to laser beam at the position of it distant by 0.1 mm outwards from the insulating resin layer in the anode terminal region, thus a chip-type solid electrolytic capacitor being formed. Suitable laser is, for example, of 2.5 msec in pulse width, 5 joules in output, and the cutting is achieved by a single exposure when the diameter of the anode lead is 0.3 mm or less. The X-ray analysis has demonstrated that during this cutting by exposure to laser beam, the resulting heat energy caused, in the portion over about 0.05 mm from the position to be cut, instantaneous fusion of tantalum material, nickel, and solder into an alloy layer 9 composed of the three metallic elements and having a great bonding strength.

To obtain a good bonding strength, the laser output power is preferably selected to be 3 to 7 joules. When the laser power exceeds 7 joules, suitable alloy layer cannot be obtained because the solder and nickel evaporate instantly.

Moreover while exposing to laser beam, an inert gas is being blown at the exposed portion in order to prevent tantalum, nickel and solder from being oxidized. Otherwise, black oxides will be produced at the cut portion, which remarkably inhibits good soldering during part-attachment process.

With the thus-made chip-type tantalum capacitor, temperature cycling tests were performed and the evaluation results of the connection reliabilities of the anode terminal with varying anode-lead cutting distances are shown in FIG. 3A. FIG. 3B illustrates the cutting distance Δx which is the distance between a cut end and the insulating resin layer 6. For comparison, similar tests were carried out with the chip-type tantalum capacitor disclosed in the above Japanese Patent, made by cutting the anode lead with a cutting blade and using as a plating catalyst the conductive layer as of silver paste. The obtained evalution results are shown in FIG. 4. The temperature cycling tests were carried out under the conditions between −55° C. and 125° C. for 30 minutes in each atmosphere until 100 cycles are completed, and the tangent of the dielectric loss (referred to as tan δ hereinafter) was measured as scale for evaluating the reliability of the connection between the anode lead wire and the anode terminal layer.

Specimens according to the embodiment of the present invention have been examined with the results that no increased in tan δ with shorter cutting distance until 0.05 mm was found. With conventional capacitors made by the method disclosed in the above Japanese Patent, degradation was found for a cutting distance of 0.5 mm, and open trouble was caused in all n=50 specimens of 0.2 mm in cutting distance. Cutting at cutting distances less than 0.2 mm could not carried out because of the thickness of the cutting blade itself. Analysis of rejections has demonstrated that anode lead and silver paste layer were separated at the interface between them. As the interfacial connection between the anode lead and the anode terminal layer were found the bonding between the anode lead and the silver paste layer in the conventional specimens with short cutting distances of 0.5 mm or less. On the other hand, in the specimens according to the present invention the bonding between the anode lead and the nickel plated layer through palladium particles, together with the production of an alloy layer consisting of three metals: tantalum, nickel and solder having similar thermal expansion coefficients, and accordingly having a great bonding strength. For this reason, no degradation in tan δ due to thermal shock will occur. Moreover for products of the prior art, the bonding between silver paste layer which is a plating catalyst and the anode lead is held by a binder resin contained in the silver paste and having a thermal expansion coefficient by far more than that of the anode lead, and probably in this circumstance separation of the silver paste may be caused by thermal shock, resulting in open trouble.

Figure 1:
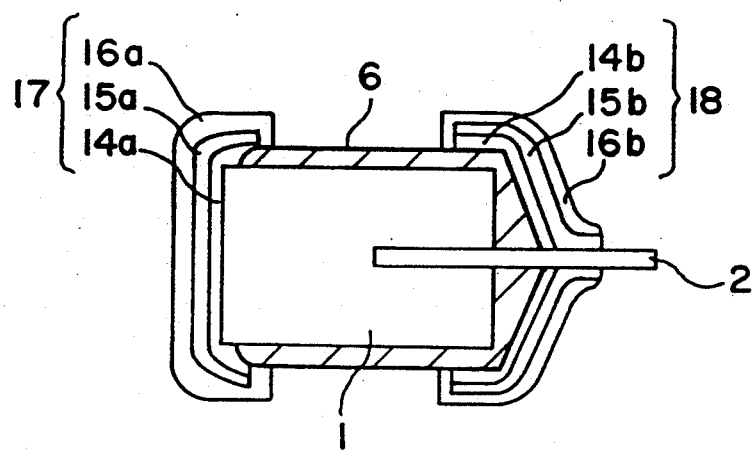
FIG. 1 shows a longitudinal sectional view of a prior art chip-type solid electrolytic capacitors.

For specimens of the prior art with long cutting distances of more than 0.6 mm, as understood from FIG. 1, the connection between the anode lead and the anode lead terminal layer is composed of the bondings between the anode lead and the silver paste layer and between the anode lead and the nickel plated layer. The latter has a high connection reliability, and probably may lead to no degradation of tan δ in the heat shock tests.

As described above, in the present invention the anode lead is cut by exposing it to laser beam with a result of forming an alloy layer having a great bonding strength at the cut end portion of the anode lead, and the associated improved connection reliability of the anode terminal, and an advantage of permitting the anode lead to be cut shorter such as 0.5 mm or less in cutting distance, and accordingly the surface of the anode terminal to become flatten, with an associated effect of enabling reduction of part-installment troubles.

What is claimed is:

1. A chip-type solid electrolytic capacitor comprising: an anode body of valve-metal, an anode lead extended from one surface of said anode body, a dielectric layer formed on said anode body, a solid electrolytic layer formed on said dielectric layer, a cathode layer formed on said solid electrolytic layer, an insulating layer formed on said cathode layer so as to cover said one surface of said anode body, a plated layer formed on said insulating layer over said one surface, a solder layer formed on said plated layer, an alloy layer formed at end portion of said anode lead, said alloy layer consisting of three metals of said anode lead, said plated layer and said solder layer.

2. The chip-type solid electrolytic capacitor as claimed in claim 1, wherein said plated layer is nickel layer and said anode lead is tantalum.

3. The chip-type solid electrolytic capacitor as claimed in claim 1, wherein a distance between the end of said anode lead and said insulating layer along said anode lead is 0.5 mm or less.

* * * * *